(12) United States Patent
Wang et al.

(10) Patent No.: US 11,352,257 B2
(45) Date of Patent: Jun. 7, 2022

(54) METHOD FOR SEPARATING METALLOFULLERENE M@C$_{82}$ AND ISOMERS THEREOF

(71) Applicants: BEIJING FULLCAN BIOTECHNOLOGY CO., LTD., Beijing (CN); INSTITUTE OF CHEMISTRY OF CHINESE ACADEMY OF SCIENCES, Beijing (CN)

(72) Inventors: Chunru Wang, Beijing (CN); Jie Li, Beijing (CN)

(73) Assignees: BEIJING FULLCAN BIOTECHNOLOGY CO., LTD., Beijing (CN); INSTITUTE OF CHEMISTRY OF CHINESE ACADEMY OF SCIENCES, Beijing (CN)

( * ) Notice: Subject to any disclaimer, the term of this patent is extended or adjusted under 35 U.S.C. 154(b) by 141 days.

(21) Appl. No.: 16/755,420

(22) PCT Filed: Oct. 12, 2018

(86) PCT No.: PCT/CN2018/110036
§ 371 (c)(1),
(2) Date: Apr. 10, 2020

(87) PCT Pub. No.: WO2019/072238
PCT Pub. Date: Apr. 18, 2019

(65) Prior Publication Data
US 2020/0239314 A1 Jul. 30, 2020

(30) Foreign Application Priority Data
Oct. 12, 2017 (CN) .......................... 201710946926.3

(51) Int. Cl.
*C01B 32/156* (2017.01)

(52) U.S. Cl.
CPC ................................ *C01B 32/156* (2017.08)

(58) Field of Classification Search
CPC ..................... C01B 32/156; C01P 2002/80–89
See application file for complete search history.

(56) References Cited

U.S. PATENT DOCUMENTS 9,522,199 B2    12/2016    Akiyama et al.
2015/0246147 A1  9/2015    Akiyama et al.

FOREIGN PATENT DOCUMENTS

CN     102115074 A    7/2011
CN     103754857 A    4/2014
(Continued)

OTHER PUBLICATIONS

Kubozono, Yoshihiro, et al. "Extractions of Y@ C60, Ba@ C60, La@ C60, Ce@ C60, Pr@ C60, Nd@ C60, and Gd@ C60 with Aniline." Journal of the American Chemical Society 118.29 (1996): 6998-6999.*

(Continued)

*Primary Examiner* — Richard M Rump
(74) *Attorney, Agent, or Firm* — Hauptman Ham, LLP

(57) ABSTRACT

A method for separating a metallofullerene M@C$_{82}$, comprises steps of: a) adding a Lewis acid to an extract containing the metallofullerene M@C$_{82}$ to react therewith, producing a complex precipitate; b) washing the precipitate, followed by dissolving and filtering to obtain a purified metallofullerene M@C$_{82}$ extract, wherein M is one or more selected from the group consisting of lanthanide metals Ce, Pr, Nd, Sm, Eu, Gd, Tb, Dy, Ho, Er, Yb, and Lu; and the Lewis acid is one or more selected from the group consisting of zinc chloride, nickel chloride, copper chloride, zinc bromide, nickel bromide, and copper bromide.

19 Claims, 9 Drawing Sheets

(56) References Cited

FOREIGN PATENT DOCUMENTS

CN 106744814 A 5/2017
JP H06321517 A 11/1994

OTHER PUBLICATIONS

Stevenson, Steven, et al. "Selective complexation and reactivity of metallic nitride and oxometallic fullerenes with lewis acids and use as an effective purification method." Inorganic chemistry 48.24 (2009): 11685-11690.*

First Office Action issued in corresponding Chinese Application No. 201710946926.3; dated May 28, 2020; State Intellectual Property Office of the P R. China, Beijing, China, 15 pgs.

Supplementary European Search Report issued in corresponding European Application No. 18865940, dated Oct. 9, 2020, European Patent Office, 2 pgs.

Wang et al., "Non-Chromatographic Purification of Endohedral Metallofullerenes", Molecules, vol. 22, No. 5, 718, Apr. 29, 2017, 14 pgs.

Stevenson et al., "Tuning the Selectivity of Gd3N Cluster Endohedral Metallofullerene Reactions with Lewis Acids", Inorganic Chemistry, vol. 53, No. 24, Nov. 21, 2014, p. 12939-12946.

Stevenson et al., "Isolation and Crystallographic Characterization of Gd3N@D2(35)-C88 through Non-Chromatographic Methods", Inorganic Chemistry, Aug. 8, 2015; 6 pgs.

Stevenson et al., "CuCl2 for the Isolation of a Broad Array of Endohedral Fullerenes Containing Metallic, Metallic Carbide, Metallic Nitride, and Metallic Oxide Clusters, and Separation of Their Structural Isomers", Inorganic Chemistry, vol. 52, Jul. 26, 2013, 7 pgs.

Akiyama et al., "Non-HPLC Rapid Separation of Metallofullerenes and Empty Cages with TiCl4 Lewis Acid", Journal of the American Chemical Society, vol. 134, 9762-9767; May 16, 2012.

International Search Report from corresponding International Application No. PCT/CN2018/110036, dated Jan. 15, 2019, pp. 1-6, State Intellectual Property Office of the P.R. China, Beijing, China.

* cited by examiner

METHOD FOR SEPARATING METALLOFULLERENE $M@C_{82}$ AND ISOMERS THEREOF

CROSS-REFERENCE

The present application is a National Phase of International Application Number PCT/CN2018/110036, filed Oct. 12, 2018, and claims priority from Chinese patent application No. 201710946926.3 filed, Oct. 12, 2017 in China National Intellectual Property Administration and entitled METHOD FOR SEPARATING METALLOFULLERENE $M@C_{82}$ AND ISOMERS THEREOF, the entire content of which is incorporated herein by reference.

TECHNICAL FIELD

The disclosure relates to the field of chemistry, and further to a method for separating a metallofullerene $M@C_{82}$ and isomers thereof.

BACKGROUND ART

Metallofullerenes, a kind of special molecules with metal ions or metal-containing clusters encapsulated inside fullerene carbon cages, not only have the physical and chemical characteristics of the fullerene carbon cages, but also can exhibit excellent optical, electrical and magnetic characteristics of the encapsulated metals or clusters, showing promising potential for application in the fields of energy devices and bio-medicine.

In 1992, Gillan et al. found that most lanthanide metals can be encapsulated within a fullerene carbon cage in the form of $M@C_{82}$ (M=Ce, Pr, Nd, Sm, Eu, Gd, Tb, Dy, Ho, Er, Yb, and Lu). The metallofullerenes, such as $Gd@C_{82}$, have shown promising potential for application in the fields of MRI contrast agents and anti-tumor drugs. With the continuously increasing applications in bio-medicine, the market demand for the metallofullerenes has risen sharply, and the scale up of their production has become a critical technical problem that should be solved urgently. However, it's difficult for the metallofullerenes with low synthesis yield and poor solubility to be purified. With the continuous improvement of the electric arc-discharge method, the yield of $M@C_{82}$ has been greatly improved, but the conventional separation of $M@C_{82}$ by high-performance liquid chromatography has the disadvantages of long time-consuming, low efficiency and high cost, which have become the critical technical bottlenecks of separation. To solve the above problems, Kazuhiko Akiyama et al. (J. Am. Chem. Soc. 2012, 134, 9762-9767) used Lewis acids such as $TiCl_4$ and $SnCl_4$ that can reversibly and preferentially react with metallofullerenes such as $La@C_{82}$, $Ce@C_{82}$ and $Gd@C_{82}$ with low oxidation potentials to produce complex precipitates, thereby achieving separation of metallofullerenes from hollow fullerenes. However, the inventors have found in practical production that $TiCl_4$, $SnCl_4$ and the like are highly deliquescent, and the separations have to be performed under the protection of an inert gas with harsh reaction conditions, which are not suitable for industrial production. In addition, $TiCl_4$, $SnCl_4$ and the like are not highly selective for fullerenes, resulting in a failure to obtain high-purity fullerenes.

According to examples of the present disclosure, as verified by a large number of experiments, a method for efficient, rapid and highly selective separation and purification of metallofullerenes with extremely high purity is achieved. By this method, metallofullerenes can be separated from hollow fullerenes simply and quickly, and on this basis, high-purity metallofullerene isomers can be further separated and extracted through strict chemical reaction kinetic control. The method according to the examples of the present disclosure has the advantages of simple operation, low cost, high feasibility, and eases of enlargement, and is suitable for large-scale separation and purification of metallofullerenes $M@C_{82}$ and isomers thereof.

SUMMARY OF THE INVENTION

An object of examples of the present disclosure is to provide a method for separating and purifying a metallofullerene with simple process route, high operability, low cost, high efficiency, high speed and high selectivity. In addition, since $M@C_{82}$ prepared by the conventional electric arc-discharge method typically has two isomers with relatively stable chemical properties: $M@C_{2v}$-$C_{82}$ and $M@C_s$-$C_{82}$, examples of the present disclosure also provides a method for achieving a high degree of separation of a specific isomer through strict chemical reaction kinetic control.

To achieve the above object of the disclosure, an example of the present disclosure provides a method for separating a metallofullerene $M@C_{82}$, which comprises the following steps:

a) complexing precipitation of the metallofullerene $M@C_{82}$ with a Lewis acid, which comprises:

adding a Lewis acid to an organic solvent extract containing the metallofullerene to react therewith, followed by filtering, and collecting the resulting precipitate and filtrate, wherein the precipitate is a complex of the metallofullerene and the Lewis acid, and the filtrate contains hollow fullerenes; and b) extraction of the metallofullerene $M@C_{82}$, which comprises:

washing the precipitate with water or an alkaline solution to remove the residual Lewis acid, then adding an organic solvent to fully dissolve the precipitate, followed by filtering, thereby obtaining a filtrate, namely an organic solvent extract of the purified metallofullerene.

In another implementable embodiment, M is one or more selected from the group consisting of lanthanide metals Ce, Pr, Nd, Sm, Eu, Gd, Tb, Dy, Ho, Er, Yb, and Lu; and the Lewis acid is one or more selected from the group consisting of zinc chloride, nickel chloride, copper chloride, zinc bromide, nickel bromide, and copper bromide.

In another implementable embodiment, the Lewis acid is optionally copper chloride, zinc bromide, or copper bromide.

In another implementable embodiment, when M is selected from the lanthanide metal Gd, the Lewis acid is optionally copper chloride or copper bromide, and further optionally copper bromide.

In another implementable embodiment, the organic solvent extract in the step (a) is one or more selected from the group consisting of benzene extract, chlorobenzene extract, toluene extract, o-xylene extract, m-xylene extract, para-xylene extract, xylene extract, carbon disulfide extract, or N,N-dimethylformamide extract, optionally the toluene extract. The organic solvent extract in the step (a) is an organic solvent extract obtained through steps of dissolving a product containing a hollow fullerenes (such as $C_{60}$, $C_{70}$) and the metallofullerene obtained by the electric arc-discharge method in a common reagent such as DMF and drying the same to remove insoluble impurities, and then adding an organic solvent thereto for ultrasonic dissolving.

In another implementable embodiment, a condition of the reaction in step (a) includes, but is not limited to, stirring or ultrasound, and the stirred reaction time can be 1-24 hours, optionally 1-8 hours, and further optionally 2-3 hours; and the ultrasonic reaction time can be 1-8 hours, optionally 1-3 hours, and further optionally 1-2 hours. Fully stirred or ultrasonic condition can facilitate dispersion of the solid Lewis acid in the organic solvent and improve the surface contact between the Lewis acid and M@$C_{82}$, thus increasing the reaction rate of the Lewis acid and M@$C_{82}$.

In another implementable embodiment, a method for collecting the precipitate and the filtrate in the step (a) or (b) includes, but is not limited to, filtering or centrifuging, so as to selectively separate M@$C_{82}$ from the extract, with the hollow fullerenes remaining in the extract.

In another implementable embodiment, the alkaline solution in the step (b) is one or more selected from the group consisting of an aqueous solution of sodium hydroxide, potassium hydroxide, sodium carbonate, potassium carbonate, sodium bicarbonate, potassium bicarbonate, lithium hydroxide, lithium carbonate and lithium bicarbonate, optionally the aqueous solution of sodium carbonate. The organic solvent in the step (b) is one or more selected from a phenyl solvent or carbon disulfide, optionally toluene, o-xylene, p-xylene, m-xylene or carbon disulfide, and furthermore optionally toluene.

In another implementable embodiment, the organic solvent extract of the metallofullerene M@$C_{82}$ obtained in the step (b) can be characterized by high-performance liquid chromatography (HPLC) and matrix-assisted laser desorption/ionization time-of-flight mass spectrometry (MALDI-TOF-MS). The test conditions of HPLC are as follows: a pyrenylethyl column (hereinafter referred to as a "PYE column") as the chromatographic column; toluene as the mobile phase; and a UV detection wavelength 300 nm. The test conditions of MALDI-TOF-MS are as follows: 1,8,9-trihydroxyanthracene as the matrix; and a positive voltage mode.

In another implementable embodiment, on the basis of the above method for separating the metallofullerene M@$C_{82}$, a Lewis acid can be further used to selectively separate metallofullerene M@$C_{82}$ isomers through chemical reaction kinetic control, which comprises the following steps:

I) adding a Lewis acid to the organic solvent extract of the metallofullerene M@$C_{82}$ containing two isomers M@$C_{2v}$-$C_{82}$ and M@$C_s$-$C_{82}$ from the step (b) for a stirred reaction or an ultrasonic reaction, followed by filtering, and collecting a precipitate and filtrate 1, wherein the precipitate is a complex of the Lewis acid and M@$C_s$-$C_{82}$, and the filtrate 1 is an organic solution containing only M@$C_{2v}$-$C_{82}$; and II) washing the precipitate with an alkaline solution to remove the residual Lewis acid, and then adding an organic solvent to fully dissolve the precipitate, followed by filtering, thereby obtaining filtrate 2, namely an organic solution containing only M@$C_s$-$C_{82}$.

In another implementable embodiment, the reaction in the step (I) lasts for 20-60 minutes, optionally 20-40 minutes, and further optionally 40 minutes; M is one or more selected from the group consisting of lanthanide metals Ce, Pr, Nd, Sm, Eu, Gd, Tb, Dy, Ho, Er, Yb, and Lu; and the Lewis acid in the step I) is one or more selected from the group consisting of zinc chloride, nickel chloride, copper chloride, zinc bromide, nickel bromide, and copper bromide.

In another implementable embodiment, the Lewis acid in the step I) is optionally copper chloride, zinc bromide, or copper bromide.

In another implementable embodiment, in the above step (I), when M is selected from the lanthanide metal Gd, the Lewis acid is optionally copper chloride or copper bromide, and further optionally copper bromide.

In another implementable embodiment, in the above step (II), the alkaline solution is one or more selected from the group consisting of aqueous solutions of sodium hydroxide, potassium hydroxide, sodium carbonate, potassium carbonate, sodium bicarbonate, and potassium bicarbonate, optionally the aqueous solution of sodium carbonate.

In another implementable embodiment, the organic solvent in the step (II) is one or more selected from a phenyl solvent or carbon disulfide, optionally toluene, o-xylene, p-xylene, m-xylene or carbon disulfide, and further optionally toluene.

In another implementable embodiment, the filtrate 1 and the filtrate 2 are characterized by HPLC, and the test conditions of HPLC are as follows: toluene as the mobile phase, a flow rate 1 mL/min, sample injection 20 μL, a UV monitoring wavelength 300 nm, and a PYE column as the chromatographic column.

Compared with the prior art, the examples of the present disclosure have the following advantages:

According to the examples of the present disclosure, by using specific Lewis acids, a method for efficient, rapid and highly selective separation and purification of metallofullerenes with extremely high purity is achieved. By this method, metallofullerenes can be separated from hollow fullerenes simply and quickly, and on this basis, high-purity metallofullerene isomers can be further separated and extracted through strict chemical reaction kinetic control. The method is simple to operate, low in cost, high in feasibility, and suitable for large-scale production of metallofullerenes.

The method according to the examples of the present disclosure has the following advantages:

1. High separation speed, high efficiency and low cost are achieved.

2. The purity of the isolated metallofullerene can reach more than 99%.

3. Highly selective separation of the metallofullerene isomers is achieved, and the purity of M@$C_{2v}$-$C_{82}$ and that of M@$C_s$-$C_{82}$ can reach 98% to 99%, respectively.

4. A specific Lewis acid is used to react, which is stable in chemical properties, not prone to deliquesce, and not required to be operated in a glove box, under the conditions of normal temperature and normal pressure with high feasibility.

5. According to the examples of the present disclosure, reaction conditions are simple; a solvent filter, a stirring apparatus or an ultrasonic reactor is employed; and with simple apparatus and fast operations, the method is easy to enlarge, and suitable for large-scale production of metallofullerenes.

DETAILED DESCRIPTION OF THE INVENTION

In order to explain the objects, technical solutions and advantages of the examples of the present disclosure more clearly, the technical solutions in the examples of the present disclosure will be illustrated clearly and completely in combination with one or more examples and corresponding drawings.

It is apparent that the described examples are part of examples of the present disclosure rather than all examples. Based on the examples of the present disclosure, all other examples obtained by a person of ordinary skill in the art without creative work shall fall within the protection scope of the present disclosure. Unless explicitly stated otherwise, the term "comprise" or variations thereof such as "comprising" throughout the description and claims will be construed to comprise the stated components, rather than exclude other elements or other components.

These examples do not limit the scope of protection. Unless otherwise stated, any example herein is not necessarily to be construed as superior to or better than the other examples.

In addition, in order to better illustrate the present disclosure, numerous specific details will be given in the following examples. Those skilled in the art should understand that the present disclosure can be implemented without some specific details. In some examples, the methods, means and elements that are well known to those skilled in the art, and experimental methods that are typically in accordance with conventional conditions and the conditions described in the manual or in accordance with the conditions recommended by the manufacturer are not described in detail in order to highlight the subject matter of the present disclosure. The materials, reagents and the like used herein are conventionally commercially available unless otherwise specified.

Example 1

Separation and Extraction of Metallofullerene Gd@$C_{82}$ (1) Separation of Metallofullerene Gd@$C_{82}$ by Copper Bromide (CuBr$_2$)

(a) Metal Gd powder and spectrography graphite powder were mixed and then put into a hollow graphite tube and compacted, and soot containing a fullerene product was obtained by the electric arc-discharge method. The soot was put into a filter paper bag and placed into a soxhlet extractor for extraction with N,N-dimethylformamide (DMF) as the solvent under the conditions of 150° C. and low vacuum for 24 hours to obtain a black solution.

Figure 1:
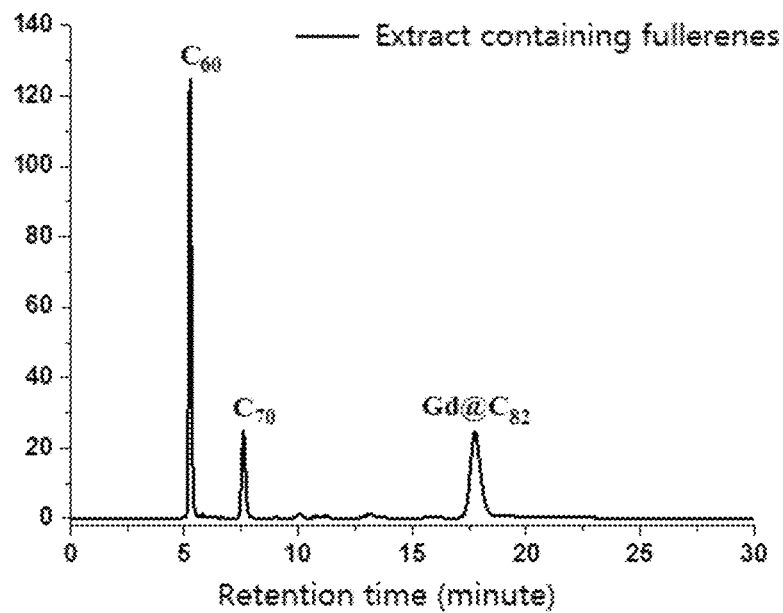
FIG. 1 is a high-performance liquid chromatogram before separation of Gd@$C_{82}$ extract with copper bromide.

(b) The above solution was filtered to remove a large amount of suspended particles, and 500 mL of the filtrate was put into a round bottom flask, and completely evaporated using a rotary evaporator. To the above round bottom flask, 500 mL of toluene was added, and then the round bottom flask was placed into an ultrasonic reactor (model: KQ-300 DB; power: 300 W; and ultrasonic frequency: 40 KHz) for an ultrasonic reaction for 2 hours; and a clear brown-yellow filtrate, namely, a toluene extract containing the hollow fullerenes and the metallofullerenes, was obtained by filtering. The above filtrate was analyzed by high-performance liquid chromatography (HPLC), as shown in FIG. 1.

Figure 3:
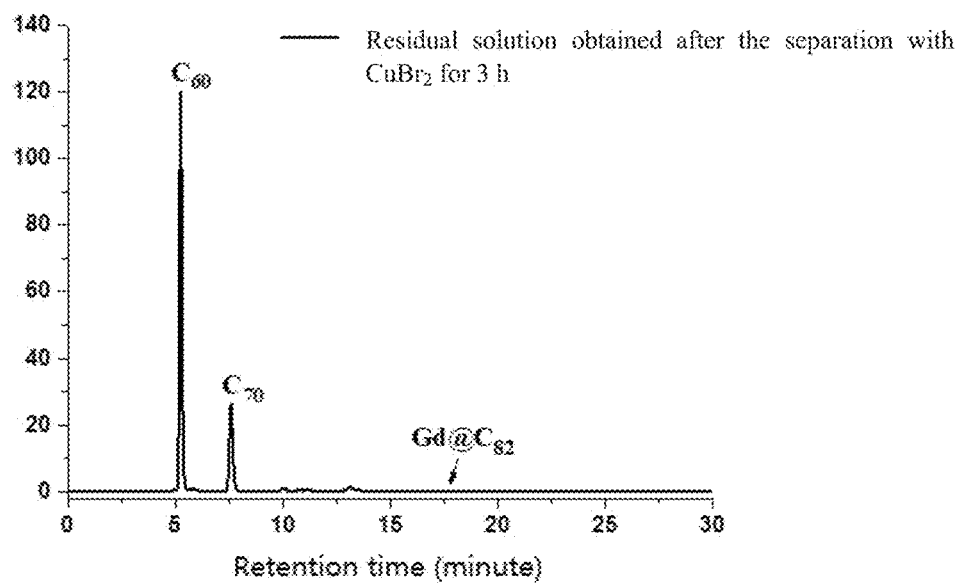
FIG. 3 is a high-performance liquid chromatogram of a solution obtained after separating Gd@$C_{82}$ extract for 3 hours with copper bromide.

(c) To the above toluene extract, 50 mg of CuBr$_2$ was added for a stirred reaction at 1000 rpm for 3 hours. During the reaction, a large amount of brown powdery precipitate was produced. The precipitate was collected after filtering using a solvent filter, and the filtrate did not contain the metallofullerene, but contained only the hollow fullerenes. The high-performance liquid chromatography (HPLC) is shown in FIG. 3.

(d) The precipitate was washed three times with an aqueous solution of sodium carbonate in the solvent filter; the residual water was removed completely by suction filtration; the washed precipitate was put into a 1000 mL triangular flask and 500 mL of toluene was added thereto, and then the triangular flask was put into the ultrasonic reactor to react for 30 minutes so that the purified metallofullerene was fully dissolved in the toluene; and a bright yellow filtrate was collected after filtering using the solvent filter.

Figure 2:
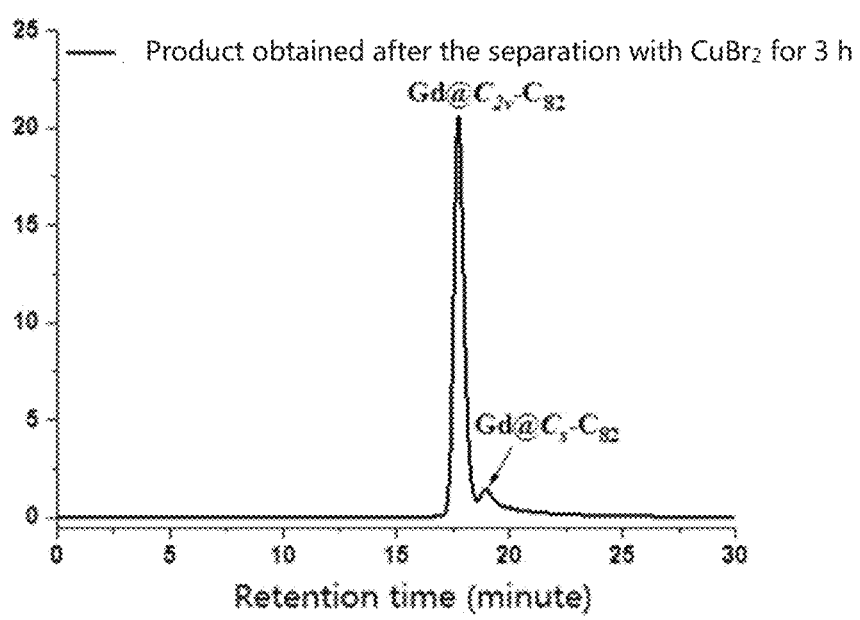
FIG. 2 is a high-performance liquid chromatogram of a product obtained after separating Gd@$C_{82}$ extract for 3 hours with copper bromide.
Figure 4:
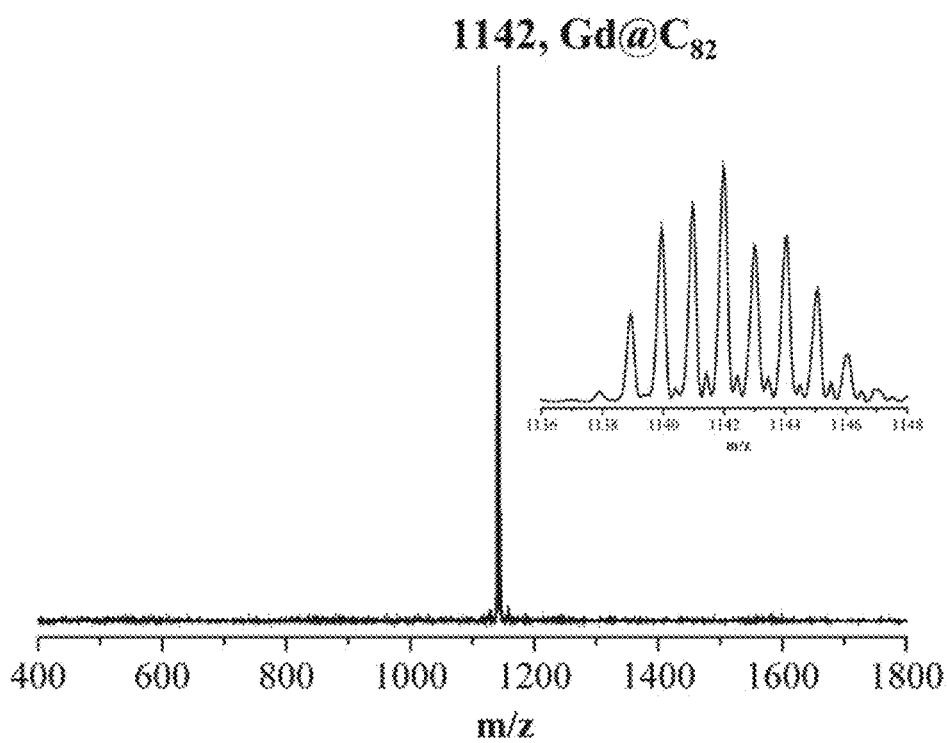
FIG. 4 is an MALDI-TOF mass spectrum of Gd@$C_{82}$ separated and purified with copper bromide.

(e) The filtrate obtained in step (d) was characterized by high-performance liquid chromatography (HPLC) and matrix-assisted laser desorption/ionization time-of-flight mass spectrometry (MALDI-TOF-MS), as shown in FIG. 2 and FIG. 4. HPLC was carried out under the conditions of toluene as the mobile phase, a flow rate 1 mL/min, sample injection 20 μL, a UV monitoring wavelength 300 nm, and a PYE column (5 μm, 4.6×250 mm, Cosmosil) as the chromatographic column, and each chromatographic peak was subject to automatic integration. The test results of HPLC and MALDI-TOF-MS proved that the purity of the isolated metallofullerene Gd@$C_{82}$ was more than 99% and the separation yield could be more than 90% (the separation yield herein is a separation recovery rate, which is calculated by dividing the finally isolated product by the content of the product in the organic solvent extract in step c).

(2) Separation of Metallofullerene Gd@$C_{82}$ by other Lewis Acids

In order to further verify the separation effects of the Lewis acids on metallofullerenes, referring to the experimental conditions of Example 1 (1), the Lewis acid were changed correspondingly without changing other parameters and steps, with results as shown in the following table 1:

TABLE 1

Separation effects of copper chloride and zinc bromide on Gd@$C_{82}$

Figure 5:
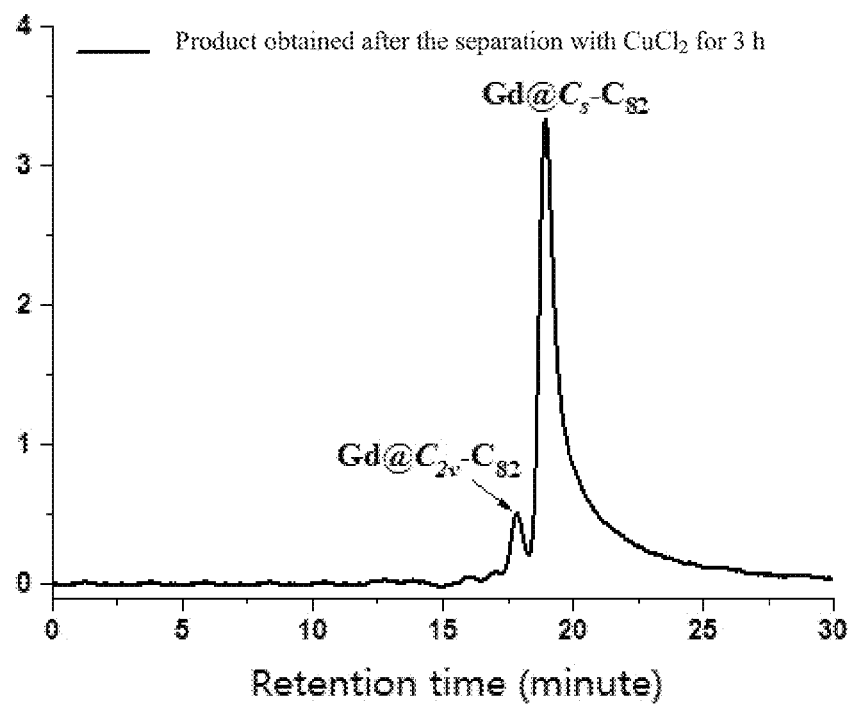
FIG. 5 is a high-performance liquid chromatogram of a product obtained after separating Gd@$C_{82}$ extract for 3 hours with copper chloride.
Figure 6:
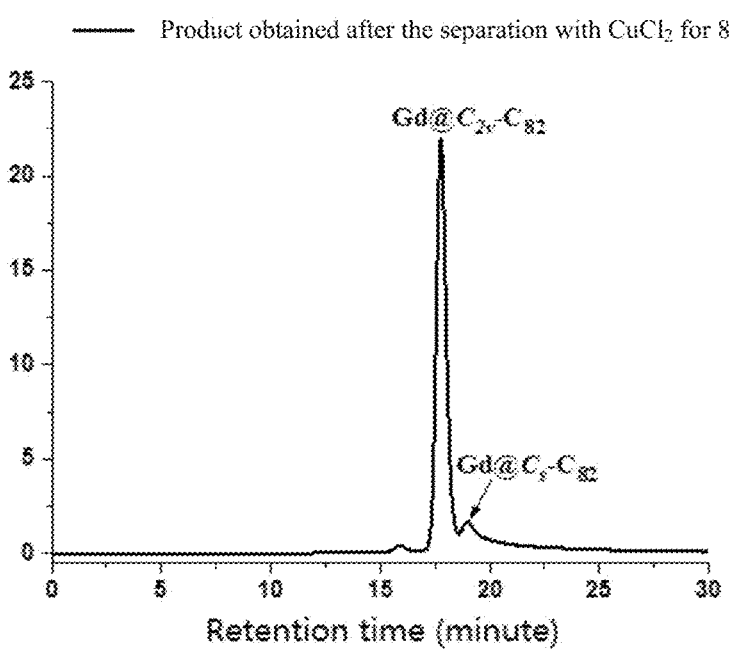
FIG. 6 is a high-performance liquid chromatogram of a product obtained after separating Gd@$C_{82}$ extract for 8 hours with copper chloride.
Figure 7:
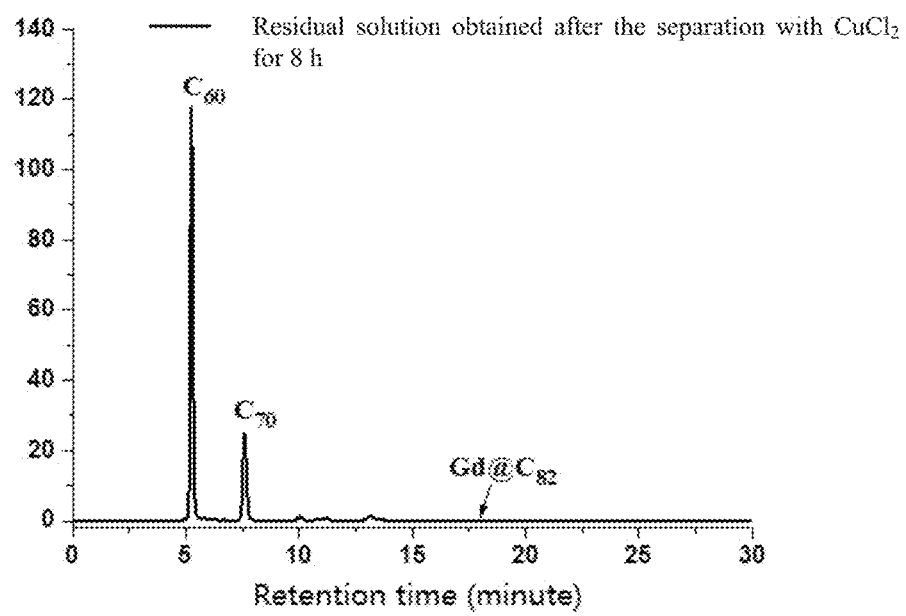
FIG. 7 is a high-performance liquid chromatogram of a solution obtained after separating Gd@$C_{82}$ extract for 8 hours with copper chloride.
Figure 8:
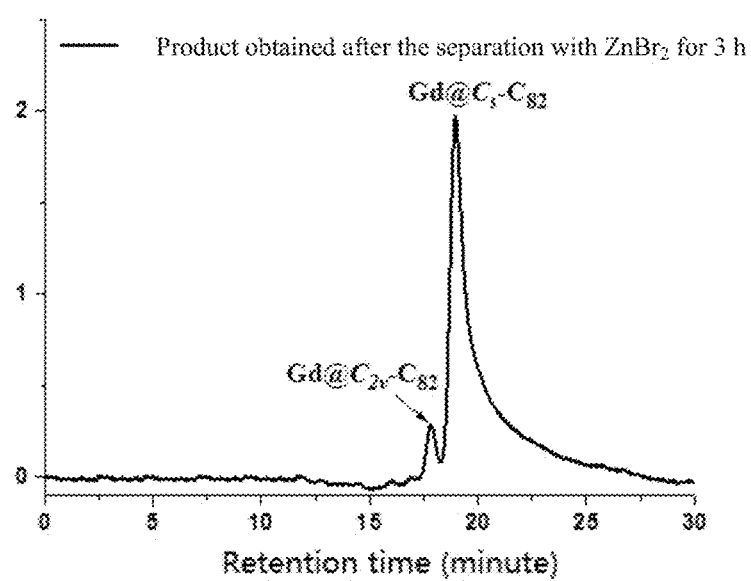
FIG. 8 is a high-performance liquid chromatogram of a product obtained after separating Gd@$C_{82}$ extract for 3 hours with zinc bromide.
Figure 9:
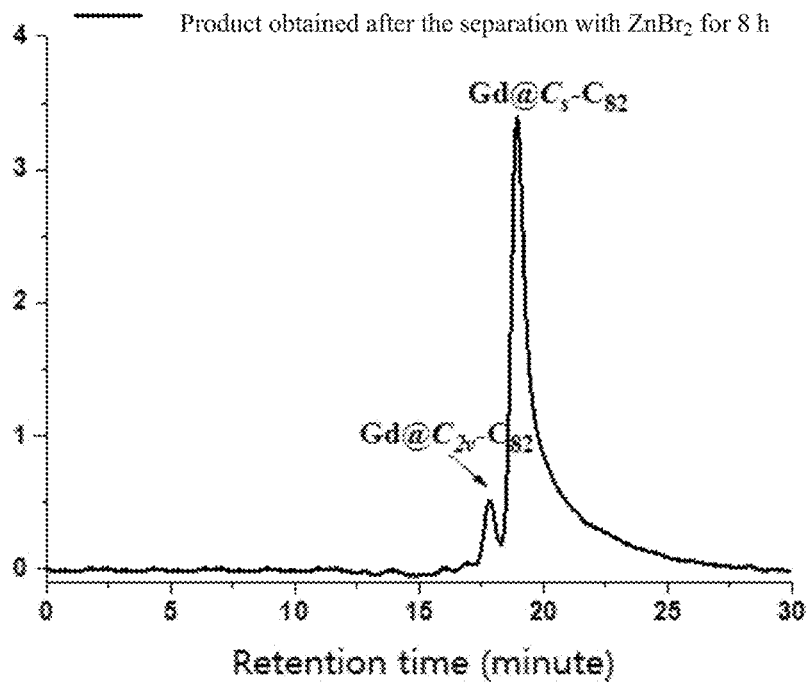
FIG. 9 is a high-performance liquid chromatogram of a product obtained after separating Gd@$C_{82}$ extract for 8 hours with zinc bromide.
Figure 10:
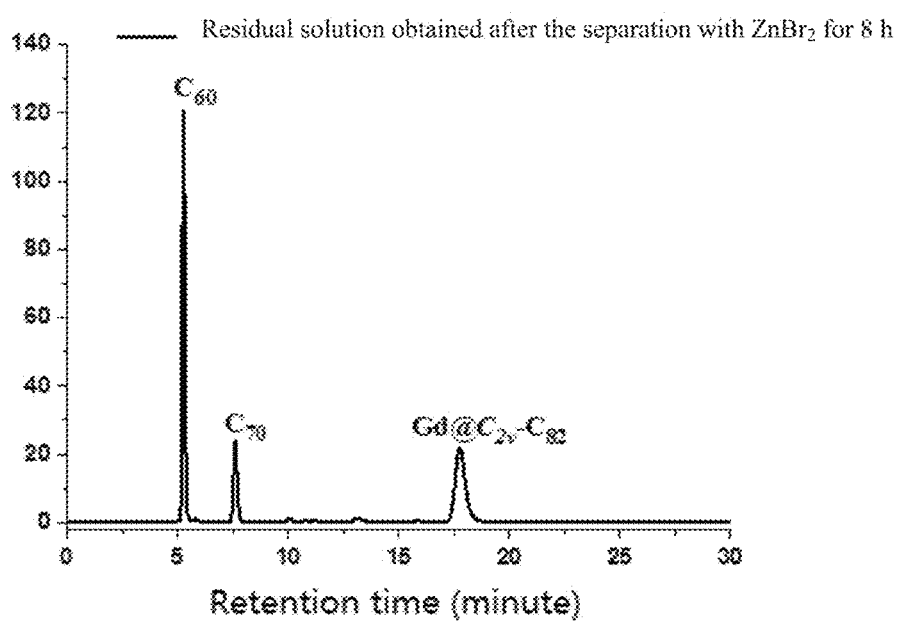
FIG. 10 is a high-performance liquid chromatogram of a solution obtained after separating Gd@$C_{82}$ extract for 8 hours with zinc bromide.

| Lewis Acid | Separation Time | High-Performance Liquid Chromatogram | Separation Purity | Separation Yield |
| --- | --- | --- | --- | --- |
| Copper chloride | 3 h | FIG. 5 | 97% | 17% |
| Copper chloride | 8 h | FIG. 6 | 97% | 70% |
| Zinc bromide | 3 h | FIG. 8 | 98% | 10% |
| Zinc bromide | 8 h | FIG. 9 | 98% | 20% |

As can be seen from the table above, other Lewis acids can also effectively separate the metallofullerene Gd@$C_{82}$. Compared with the separation of Gd@$C_{82}$ by copper bromide for 3 h with the purity of 99% and the separation yield of 90%, the separation by copper chloride was lower in separation rate and separation yield, and the separation time of 8 hours was required to isolate Gd@$C_{82}$ with the purity of 97%, of which the separation yield could reach 70%. Zinc bromide could only separate the isomer Gd@$C_s$-$C_{82}$, and could not isolate another isomer Gd@$C_{2v}$-$C_{82}$, so its separation yield could only reach about 20%.

(3) Influence of Reaction Parameters

In order to determine the influence of parameters such as reaction time on the separation effects in the example of the present disclosure, the parameters of each reaction were changed correspondingly without changing other parameters and steps, with the results as shown in table 3 below:

TABLE 3

Separation effects of copper bromide on Gd@$C_{82}$ under different reaction conditions

| Concentration of Reactant Gd@$C_{82}$ in Toluene Extract in Step b) | Dosage of Copper Bromide | Reaction Condition | Reaction Time | Separation Purity | Separation Result |
| --- | --- | --- | --- | --- | --- |
| ~10 mg/mL | 50 mg | Stirring | 3 h | 99% | Completely separated |
| ~10 mg/mL | 100 mg | Stirring | 2 h | 99% | Completely separated |
| ~10 mg/mL | 50 mg | Ultrasound | 2 h | 99% | Completely separated |
| ~10 mg/mL | 100 mg | Ultrasound | 1 h | 99% | Completely separated |

As can be seen from the above table, under different reaction conditions, copper bromide can isolate the metallofullerene Gd@$C_{82}$ with the purity of up to 99%. Regardless of stirring operation or ultrasonic operation, increasing the dosage of the Lewis acid can accelerate the reaction rate and shorten the required reaction time.

Example 2

Selective Separation of Gd@$C_{82}$ Isomers (1) Separation of Metallofullerene Gd@$C_{82}$ Isomers by Copper Bromide ($CuBr_2$)

(a) The metallofullerene Gd@$C_{82}$ prepared by the conventional electric arc-discharge method typically has two isomers with relatively stable chemical properties: Gd@$C_{2v}$-$C_{82}$ and Gd@$C_s$-$C_{82}$; for example, the bright yellow filtrate isolated in step (d) of Example 1 (1) contained two Gd@$C_{82}$ isomers, as shown in FIG. 2. To 500 mL of this solution, 10 mg of $CuBr_2$ was added, and the stirring (revolving speed: 1000 rpm) time was accurately controlled to be 40 minutes. $CuBr_2$ reacted preferentially with the isomer Gd@$C_s$-$C_{82}$ to produce a complex precipitate; the precipitate was collected after filtering using a solvent filter, and the filtrate contained only the other isomer Gd@$C_{2v}$-$C_{82}$.

(b) The precipitate containing only the isomer Gd@$C_s$-$C_{82}$ was washed three times with an aqueous solution of sodium carbonate in the solvent filter; the residual water was removed completely by suction filtration; the washed precipitate was put into a 1000 mL triangular flask and 500 mL of toluene was added thereto, and then ultrasonic treatment was carried out for 30 minutes so that the metallofullerene was fully dissolved; and a bright yellow isomer Gd@$C_s$-$C_{82}$ filtrate was collected after filtering using the solvent filter.

Figure 13:
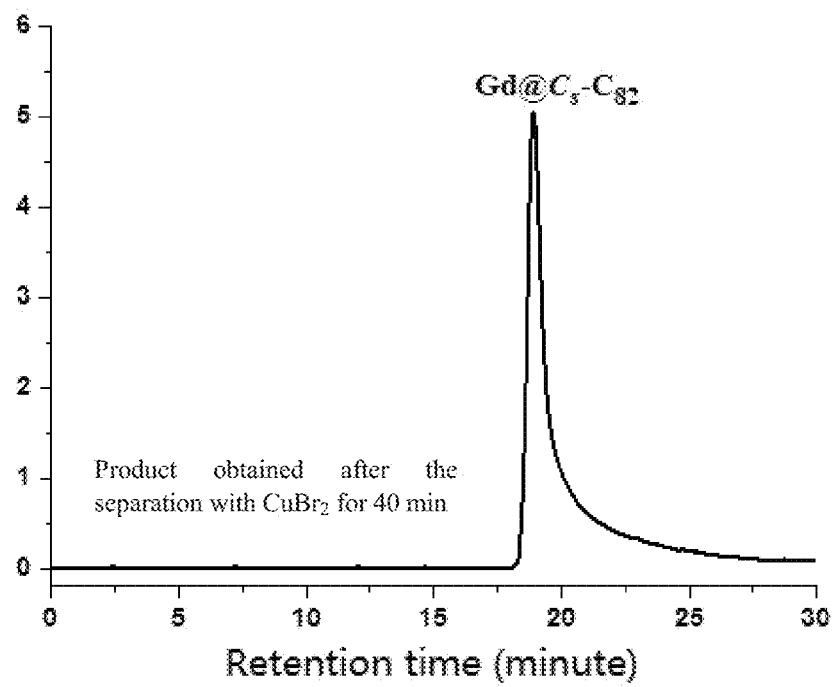
FIG. 13 is a high-performance liquid chromatogram of a product after separating Gd@$C_{82}$ isomer solution for 40 minutes with copper bromide.
Figure 14:
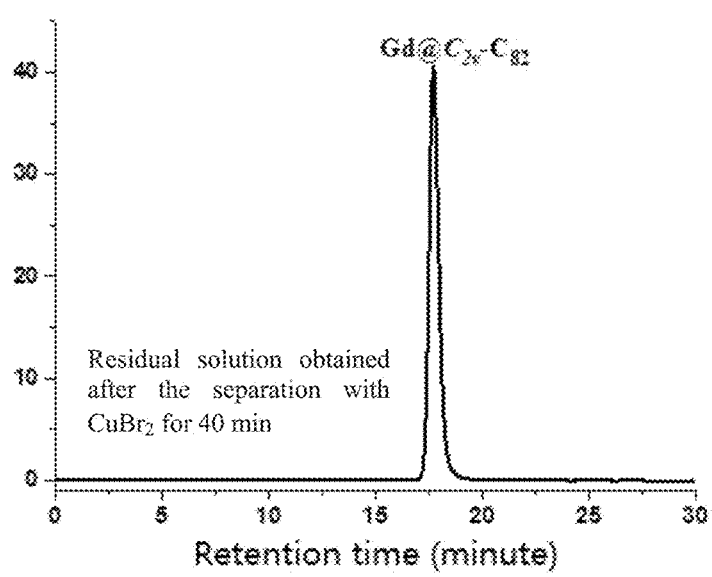
FIG. 14 is a high-performance liquid chromatogram of a solution after separating Gd@$C_{82}$ isomer solution for 40 minutes with copper bromide.

(c) Characterization was carried out by HPLC; under the conditions of toluene as the mobile phase, a flow rate 1 mL/min, sample injection 20 μL, a UV monitoring wavelength 300 nm, a PYE column (5 μm, 4.6×250 mm) as the chromatographic column, the isomers Gd@$C_s$-$C_{82}$ and Gd@$C_{2v}$-$C_{82}$ isolated in steps (a) and (b) were analyzed, respectively, and each chromatographic peak was subjected to automatic integration, proving that the isomer Gd@$C_s$-$C_{82}$ was isolated in the purity of 98% (FIG. 13) and the isomer Gd@$C_{2v}$-$C_{82}$ was isolated in the purity of 99% (FIG. 14).

Figure 17:
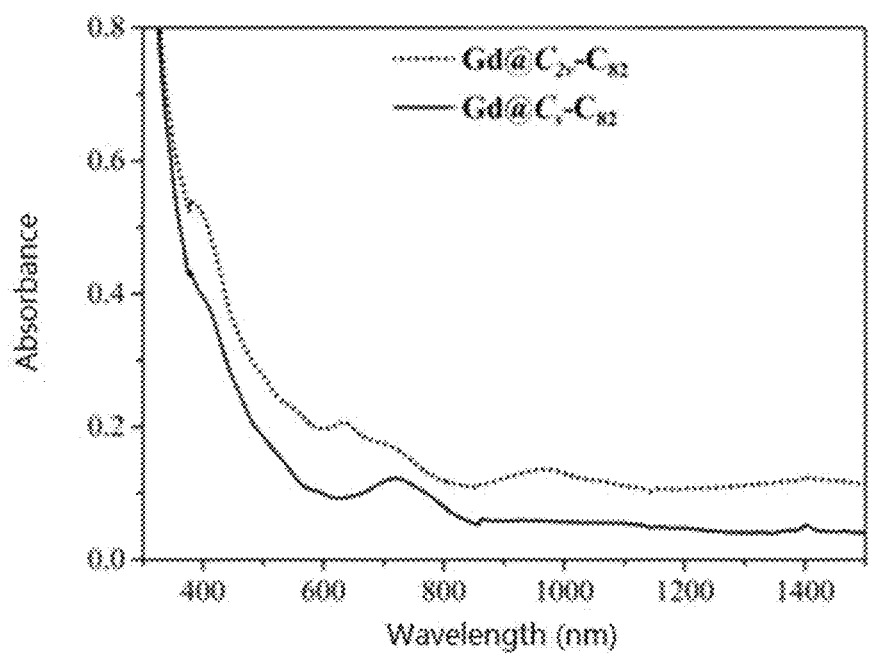
FIG. 17 is an ultraviolet—visible—near infrared spectrum of two isomers (Gd@$C_{2v}$-$C_{82}$ and Gd@$C_s$-$C_{82}$) obtained after separation of Gd@$C_{82}$ isomer solution with copper bromide.

(d) Spectroscopic characterization of the isomers Gd@$C_s$-$C_{82}$ and Gd@$C_{2v}$-$C_{82}$ isolated in steps (a) and (b) was carried out by using an ultraviolet-visible-near infrared spectrometer, respectively, as shown in FIG. 17; and their absorption spectra were consistent with literature reports, thus proving that high-purity Gd@$C_{82}$ isomers can be isolated through chemical reaction kinetic control.

(2) Influence of Reaction Parameters

In order to determine the influence of parameters such as reaction time on the separation effects in the example of the present disclosure, the parameters of each reaction time were changed correspondingly without changing other parameters and steps, with the results as shown in table 4 below:

TABLE 4

Separation effects of copper bromide on $Gd@C_{82}$ isomers under different reaction time

| Concentration of Reactant $Gd@C_{82}$ in Toluene Extract in Step b) | Reaction Condition | Reaction Time | Isomer $Gd@C_s$-$C_{82}$ Purity | Isomer $Gd@C_{2v}$-$C_{82}$ Purity |
|---|---|---|---|---|
| ~10 mg/mL | Stirring | 20 min | 99% | 95% |
| ~10 mg/mL | Stirring | 40 min | 99% | 99% |
| ~10 mg/mL | Stirring | 60 min | could not be separated | 99% |

Figure 11:
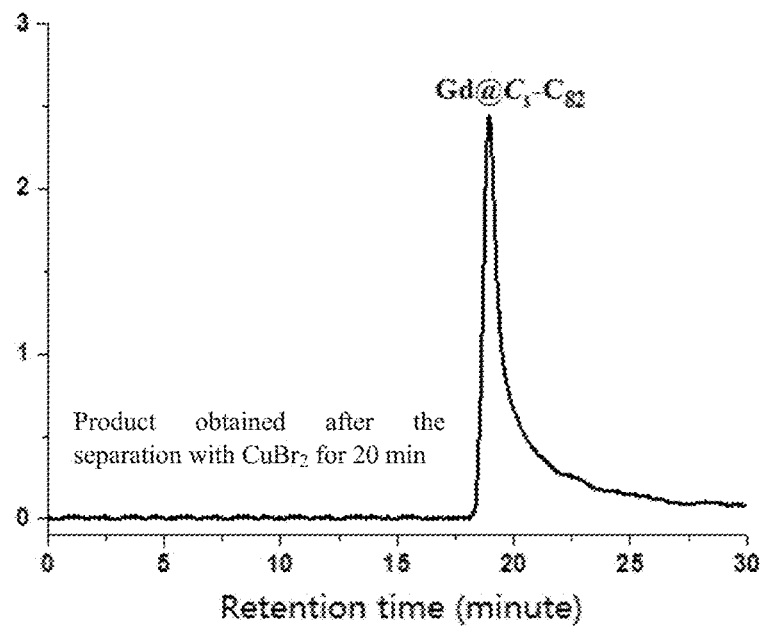
FIG. 11 is a high-performance liquid chromatogram of a product obtained after separating Gd@$C_{82}$ isomer solution for 20 minutes with copper bromide.
Figure 12:
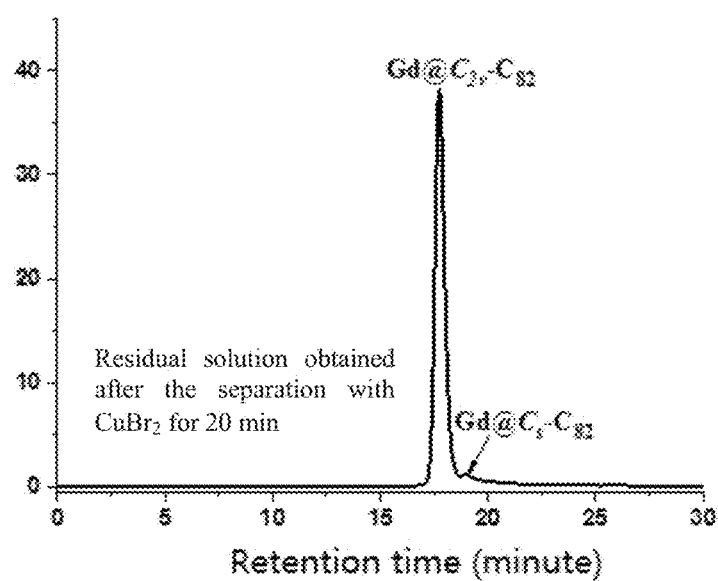
FIG. 12 is a high-performance liquid chromatogram of a solution obtained after separating Gd@$C_{82}$ isomer solution for 20 minutes with copper bromide.
Figure 15:
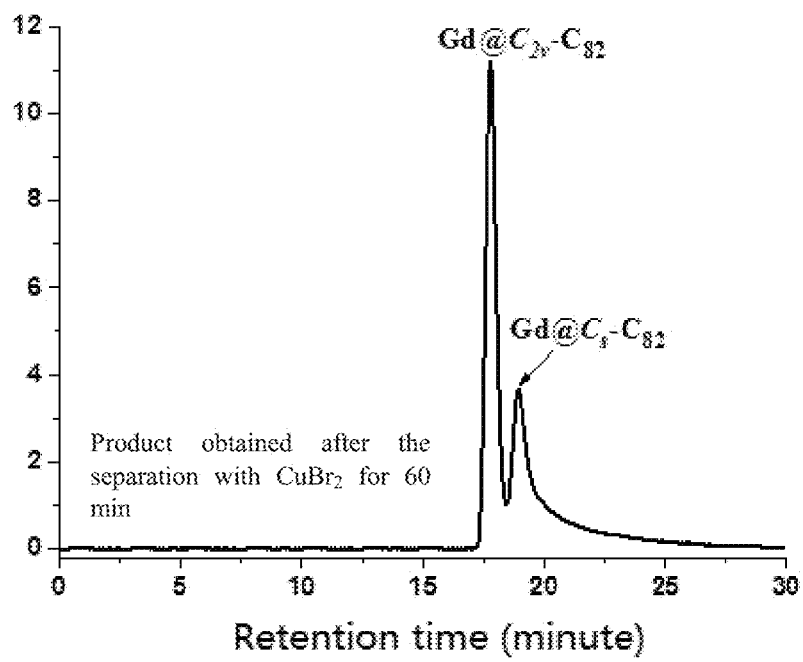
FIG. 15 is a high-performance liquid chromatogram of a product after separating Gd@$C_{82}$ isomer solution for 60 minutes with copper bromide.
Figure 16:
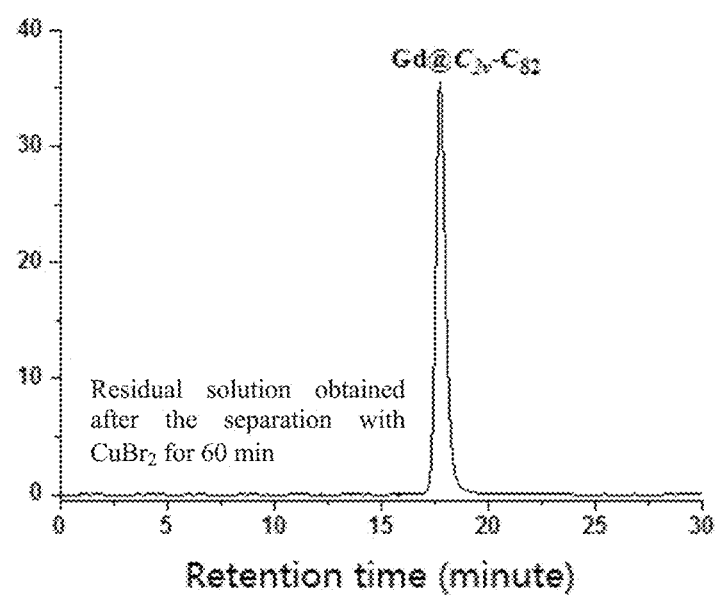
FIG. 16 is a high-performance liquid chromatogram of a solution after separating Gd@$C_{82}$ isomer solution for 60 minutes with copper bromide.

As can be seen from the above table, when copper bromide was used to separate the isomers of the purified $Gd@C_{82}$ (as shown in FIG. 2) in Example 1 (1), high-purity $Gd@C_{82}$ isomers could be isolated by strictly controlling the reaction time of the copper bromide and $Gd@C_{82}$. After reaction for 20 minutes, only part of the isomer $Gd@C_s$-$C_{82}$ was isolated by the copper bromide (as shown in FIG. 11), and a small amount of isomer $Gd@C_s$-$C_{82}$ (about 5%) and a large amount of isomer $Gd@C_{2v}$-$C_{82}$ (about 95%) were present in the solution, as shown in FIG. 12. After reaction for 40 minutes, all of the isomer $Gd@C_s$-$C_{82}$ was isolated by the copper bromide (as shown in FIG. 13), and only the isomer $Gd@C_{2v}$-$C_{82}$ was present in the solution (as shown in FIG. 14). After reaction for 60 minutes, all of the isomer $Gd@C_s$-$C_{82}$ and part of the isomer $Gd@C_{2v}$-$C_{82}$ were isolated by the copper bromide (as shown in FIG. 15), and only the isomer $Gd@C_{2v}$-$C_{82}$ was present in the solution (as shown in FIG. 16). Therefore, the reaction time of the copper bromide and $Gd@C_{82}$ must be strictly controlled to ensure that all of the isomer $Gd@C_s$-$C_{82}$ was isolated by the copper bromide with only the isomer $Gd@C_{2v}$-$C_{82}$ remaining in the solution; thus, high-purity $Gd@C_{82}$ isomers were isolated through such chemical reaction kinetic control.

Finally, it should be noted that the above examples are only used to illustrate rather than limit the technical solutions of the present disclosure. Although the present disclosure has been described in detail with reference to the foregoing examples, those of ordinary skill in the art should understand that modifications can still be made to the technical solutions described in the foregoing examples, or equivalent replacements can be made to some of the technical features thereof; and these modifications or replacements do not cause the essence of the corresponding technical solution to depart from the spirit and scope of the technical solution in each example of the present disclosure.

INDUSTRIAL APPLICABILITY

A method for separating a metallofullerene $M@C_{82}$ and an isomer thereof provided according to the examples of the present disclosure uses a specific Lewis acid to achieve effective, rapid, and highly selective separation with extremely high purity. The method comprises the following steps: a) complexing precipitation of the metallofullerene $M@C_{82}$ by a Lewis acid; and b) extraction of the metallofullerene $M@C_{82}$. By this method, metallofullerenes can be separated from hollow fullerenes simply and quickly, and high-purity metallofullerene isomers can be further isolated through strict chemical reaction kinetic control. This method is simple to operate, low in cost, high in feasibility, and suitable for large-scale production of metallofullerenes.

The invention claimed is:

1. A method for separating a metallofullerene $M@C_{82}$, comprising the following steps:
    a) complexing precipitation of the metallofullerene $M@C_{82}$ with a Lewis acid, which comprises:
       adding a Lewis acid to an organic solvent extract containing the metallofullerene $M@C_{82}$ to react therewith, followed by filtering, and collecting the resulting precipitate and filtrate, wherein the precipitate is a complex of the metallofullerene $M@C_{82}$ and the Lewis acid, and the filtrate contains hollow fullerenes; and
    b) extraction of the metallofullerene $M@C_{82}$, which comprises:
       washing the precipitate with water or an alkaline solution to remove the residual Lewis acid, then adding an organic solvent to fully dissolve the precipitate, followed by filtering, thereby obtaining a filtrate, which is a purified organic solvent extract of the metallofullerene $M@C_{82}$;
    wherein M is one or more selected from the group consisting of lanthanide metals Ce, Pr, Nd, Sm, Eu, Gd, Tb, Dy, Ho, Er, Yb, and Lu; and
    the Lewis acid is copper bromide.

2. The method according to claim 1, wherein M is the lanthanide metal Gd.

3. The method according to claim 1, wherein the organic solvent extract in the step (a) is one or more selected from the group consisting of benzene extract, chlorobenzene extract, toluene extract, o-xylene extract, m-xylene extract, para-xylene extract, carbon disulfide extract, and N,N-dimethylformamide extract.

4. The method according to claim 1, wherein reaction conditions in the step (a) are a stirred reaction, and reaction time is 1-24 hours.

5. The method according to claim 1, wherein reaction conditions in the step (a) are an ultrasonic reaction, and reaction time is 1-8 hours.

6. The method according to claim 1, wherein said collecting the precipitate and filtrate in the step (a) is by filtering or by centrifuging.

7. The method according to claim 1, wherein the alkaline solution in the step (b) is one or more selected from the group consisting of aqueous solutions of sodium hydroxide, potassium hydroxide, sodium carbonate, potassium carbonate, sodium bicarbonate, potassium bicarbonate, lithium hydroxide, lithium carbonate and lithium bicarbonate.

8. The method according to claim 1, wherein the organic solvent in the step (b) is one or more selected from a phenyl solvent or carbon disulfide.

9. The method according to claim 1, wherein the filtrate obtained in the step (b) contains two isomers: $M@C_{2v}$-$C_{82}$ and $M@C_s$-$C_{82}$.

10. The method according to claim 9, further comprising steps of separating the two isomers:
    I) adding a Lewis acid to the purified organic solvent extract of the metallofullerene $M@C_{82}$ for a stirred reaction or an ultrasonic reaction, followed by filtering, and collecting a precipitate and filtrate 1, wherein the precipitate is a complex of the Lewis acid and $M@C_s$-$C_{82}$, and the filtrate 1 is an organic solution containing only $M@C_{2v}$-$C_{82}$; and II) washing the precipitate with an alkaline solution to remove the residual Lewis acid, and then adding an organic solvent to fully dissolve the precipitate, followed by filtering, thereby obtaining filtrate 2, which is an organic solution containing only $M@C_s\text{-}C_{82}$, wherein the reaction in the step (I) lasts for 20-60 minutes.

11. The method according to claim 10, wherein the alkaline solution in the step (II) is one or more selected from the group consisting of aqueous solutions of sodium hydroxide, potassium hydroxide, sodium carbonate, potassium carbonate, sodium bicarbonate, and potassium bicarbonate.

12. The method according to claim 10, wherein the organic solvent in the step (II) is one or more selected from a phenyl solvent or carbon disulfide.

13. The method according to claim 10, wherein the Lewis acid in the step (I) is one or more selected from the group consisting of zinc chloride, nickel chloride, copper chloride, zinc bromide, nickel bromide, and copper bromide.

14. The method according to claim 10, wherein in the step (I), when M is selected from the lanthanide metal Gd, the Lewis acid is copper chloride or copper bromide.

15. The method according to claim 1, wherein the organic solvent extract in the step (a) is toluene extract.

16. The method according to claim 1, wherein reaction conditions in the step (a) are a stirred reaction, and reaction time is 1-8 hours.

17. The method according to claim 1, wherein reaction conditions in the step (a) are an ultrasonic reaction, and reaction time is 1-3 hours.

18. The method according to claim 1, wherein the organic solvent in the step (b) is one or more selected from toluene, o-xylene, p-xylene, m-xylene, or carbon disulfide.

19. The method according to claim 10, wherein the organic solvent in the step (II) is one or more selected from toluene, o-xylene, p-xylene, m-xylene, or carbon disulfide.

* * * * *